Oct. 19, 1943.       A. L. PARKER        2,332,007
SUMP SELECTOR VALVE FOR FUEL TANKS
Filed March 14, 1941         2 Sheets-Sheet 1
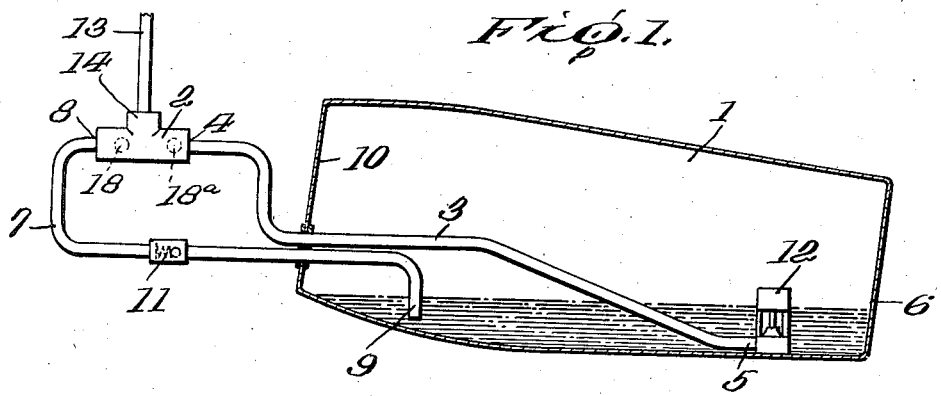
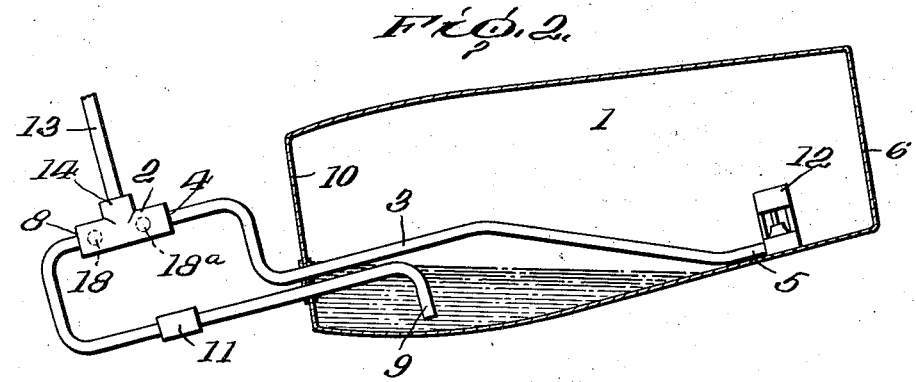
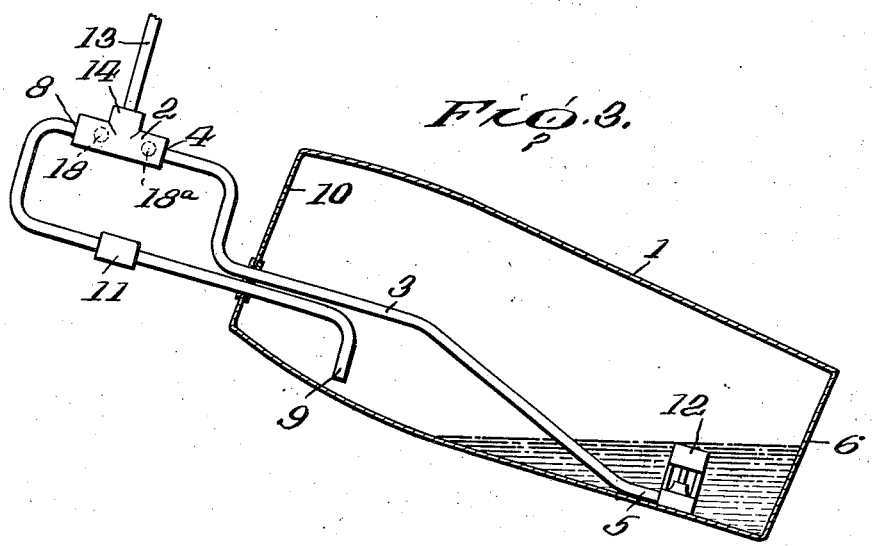
INVENTOR
Arthur L. Parker
By
Mason & Porter
ATTORNEYS

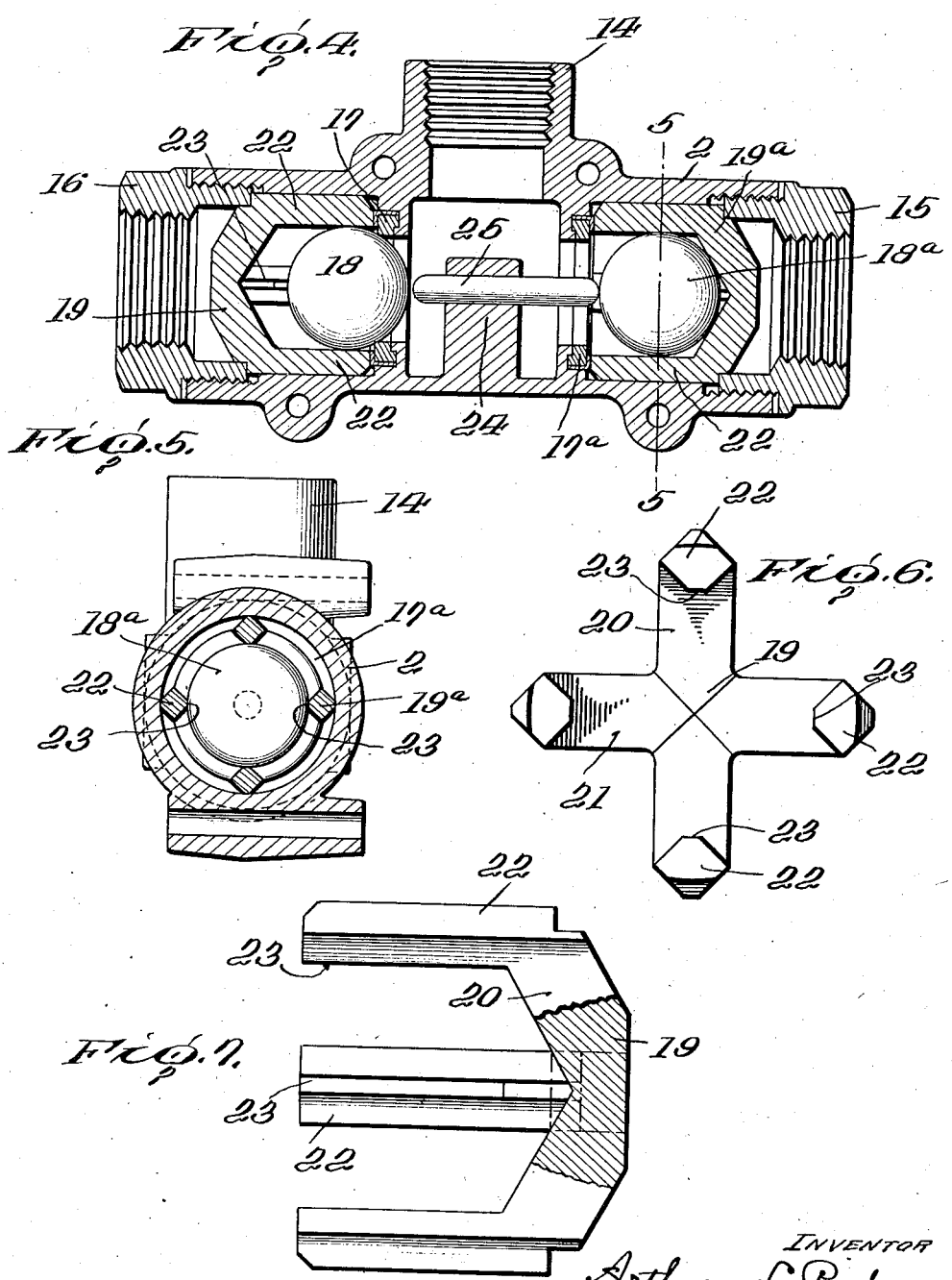

Patented Oct. 19, 1943

2,332,007

UNITED STATES PATENT OFFICE 2,332,007

SUMP SELECTOR VALVE FOR FUEL TANKS

Arthur L. Parker, Cleveland, Ohio

Application March 14, 1941, Serial No. 383,421

2 Claims. (Cl. 277—20)

The invention relates to new and useful improvements in a sump selector valve for use in connection with the fuel supply tank in an airplane. The fuel supply tank is, of course, fixed relative to the frame structure so that when the airplane assumes level flight, the longitudinal axis of the tank is substantially horizontal. When the airplane is at rest on the ground, the tank is tilted upward so that the fuel lies at the back end of the tank, and the tank will remain tilted until the airplane has reached the desired altitude and assumes a level flight. During flight, the tank will be tilted as the airplane moves upward or downward and during banking. If a single fuel dispensing pipe leads from the tank, it sometimes happens during this tilting movement that the end of the pipe becomes uncovered and the pumps supplying the engine will receive air from the pipe and deliver the same to the engine.

An object of the present invention is to provide a plurality of fuel dispensing pipes which terminate adjacent the ends of the tank, or at widely spaced points in the tank, with which pipes is associated a sump selector valve mounted for tilting movement with the tank and which is so disposed that gravity-actuated valves therein will control the dispensing pipes whereby fuel will be supplied solely from the pipe leading to the lowermost position in the tank during its tilting movements.

A further object of the invention is to provide a sump selector valve for the use above described which is so constructed that the valves will move freely by gravity when the airplane tilts fore and aft, and at the same time is tilted laterally for banking.

A still further object of the invention is to provide a sump selector valve of the above type wherein there is a separate gravity-actuated valve for controlling the dispensing pipes and a means associated with the valves which insures that both valves cannot seat at the same time and thus cut off all supply of fuel.

These and other objects will in part be obvious and will in part be hereinafter more fully disclosed.

In the drawings which show by way of illustration one embodiment of the invention—

Figure 1 is a view showing more or less diagrammatically a fuel supply tank for an airplane and the improved sump selector valve associated therewith;

Fig. 2 is a similar view showing the position of the tank and sump selector valve when the airplane is diving;

Fig. 3 is a view similar to Figure 1, but showing the position of the tank and sump selector valve when the airplane is rising;

Fig. 4 is an enlarged longitudinal sectional view through the sump selector valve;

Fig. 5 is a sectional view on the line 5—5 of Figure 4;

Fig. 6 is an end view of the valve cage in which one of the valves is guided, and Fig. 7 is a side view of the same.

The invention is directed to a sump selector valve adapted to be used in connection with a fuel supply tank for an airplane or other aircraft. It is believed that the invention will be best understood by a detail description of the illustrated embodiment thereof.

In the drawings, a fuel supply tank is indicated diagrammatically at 1 and the sump selector valve which is associated therewith is likewise indicated diagrammatically at 2. A dispensing pipe 3 is connected to the end 4 of the sump selector valve 2 and terminates at 5 in the tank which is a point adjacent one end of the tank. This dispensing pipe 3 is rigidly attached to the tank. There is a fuel dispensing pipe 7 attached to the opposite end of the sump selector valve 2, and this pipe terminates at 9 adjacent the other end 10 of the fuel supply tank. This pipe is also rigidly attached to the tank. The tank is, of course, rigidly attached to the frame structure of the airplane, and likewise the sump selector valve is rigidly attached to the frame structure.

While I have referred to the ends of the tank, it is understood that the pipes may terminate adjacent the sides of the tank, but it is essential that they shall terminate in the tank at widely spaced points. The longitudinal axis of the sump selector valve, for reasons hereinafter stated, lies substantially in a plane containing or parallel to a line passing through the ends of the supply pipes.

The pipe 7 is provided with a check valve 11 which prevents fuel from flowing from the valve casing back through the pipe 7 into the tank. Associated with the pipe 3 is an electric booster pump illustrated diagrammatically at 12.

The sump selector valve is shown in detail in Figures 4 to 7. It includes a valve casing having an outlet 14 to which a pipe 13 is connected. This pipe leads to the fuel system which includes an engine-driven pump and a primer. The pipe 3 is threaded into an adapter 15 and thus connected to one end of the sump selector valve casing. The pipe 7 is threaded into an adapter 16 which is connected to the opposite end of the valve casing. A valve seat 17 is mounted in the casing 2 at one side of and adjacent the outlet 14. A ball or spherical valve 18 is adapted to cooperate with the valve seat 17. There is a cage 19 for the ball valve, which cage is shown in detail in Figures 6 and 7. The cage includes cross arms 20 and 21, and parallel guide rods 22 located at the outer ends of the cross arms. These guide rods are shaped so as to provide guiding faces 23 with which the ball valve contacts. The ball valve is free to move back and forth in the cage and will roll easily on these guiding faces. There is a similar valve seat 17a adjacent the opposite side of the outlet 14, and a similar spherical or ball valve 18a which cooperates therewith. There is likewise a similar ball valve cage 19a for the ball 18a.

The valve casing is provided with a lug 24 in which is mounted a rod 25 for free endwise movement. The ends of this rod 25 are rounded, and the rod is so disposed that the ends of the rod will contact with the ball valves, and the rod as to length is dimensioned so that the two valves cannot seat at the same time.

When the airplane is on the ground, the engines are off and the engine-driven pump is not running. The airplane is tilted upward so that the fuel lies in the back end of the tank. The sump selector valve is, therefore, also tilted so that the ball 18a moves by gravity away from its seat so that the valve is opened. The ball 18 will move by gravity into engagement with the seat 17 and close this opening. This position of the tank is illustrated in Figure 3.

The electric booster pump 12 aids in starting the engines. It is started and will pump fuel up through the valve controlled by the ball 18a on through the pipe 13 and through the engine-driven pump to the carburetor. Some of the fuel enters the priming line and is distributed to the engine cylinders. As soon as the engine starts and the engine-driven pump starts functioning, it creates a suction on the line leading to the tank and will draw fuel from the pipe 3. The electric booster pump is preferably left running until the airplane has risen to the desired altitude and is shut off when the airplane assumes level flight. While the electric booster pump is shut off, fuel is drawn from the tank by the suction of the engine-driven pump, and the sump selector valve is in a substantially horizontal position, so that either the valve 18 or the valve 18a may be open, or both may be slightly open at the same time.

When the airplane tilts forward and downward to the position shown in Figure 2, then the ball valve 18 will open, and the ball valve 18a will close by gravity, and therefore, fuel will be drawn from the tank through the pipe 7. The lug 24 is disposed between the intake ports and the valve seats 17, 17a associated therewith and serves as a baffle preventing the direct impingement of the flowing fluid against the valve which is closed. This is very important, especially at slight tilt angles of the valve casing when the seating component is considerably less than the weight of the ball. Otherwise, direct impingement of fluid flowing in at the low end of the valve tends to unseat the ball at the upper end and cause chattering or where the fuel supply is very low to unseat the valve and admit air into the system.

The electric booster pump is of the usual construction and fuel can be drawn through it while it is inoperative. As stated above, its principal purpose is to supply fuel when starting the engine, and it also serves as an energizing pump in the event the engine-driven pump should fail.

The check valve 11 is used as a precaution against fuel being returned to the tank when the booster pump is in operation, as the latter develops a pressure which might lift the ball valve 18 off its seat.

As has already been noted, the fuel pipes may lead from opposite ends of the tank or opposite sides of the tank, but it is essential that they shall be widely spaced so that when the tank is tilted and the fuel moves to one end or the other, or to one side or the other, one of the pipes shall end in the fuel which flows by gravity to the lowest point in the tank. It is also essential that the sump selector valve shall be disposed substantially with its longitudinal axis in the general direction of a line passing through the ends of the pipes so that the valves may be moved by gravity so as to properly control the pipes and cut off any suction from a pipe when the end thereof is out of the fuel.

It is obvious that changes may be made in the details of construction and the arrangement of the parts without departing from the spirit of the invention as set forth in the appended claims.

Having thus described the invention, what I claim as new and desire to secure by Letters Patent is:

1. A valve for dispensing fuel from an aircraft tank comprising an elongated valve casing, having intake ports arranged at opposite ends of the casing and an outlet port intermediate the ends of the valve casing, said inlet ports being adapted to be connected to the tank at points adjacent the front and rear sides thereof respectively, a valve seat disposed between each intake port and the outlet port, a spherical valve disposed between each valve seat and the outer end of the casing, guiding means for each spherical valve on which it will roll and move in a line perpendicular to the plane of the seat when said valve casing is tilted, said guiding means being constructed so as to permit free flow of fuel from the intake port past the spherical valve when in open position, means for stopping the movement of the spherical valve toward its intake port so as to provide a free passage for fuel from the intake port around the spherical valve and through the open seat to the outlet port, a lug disposed in the valve casing between the valve seats and serving as a baffle to prevent fuel entering through an open seat contacting with and unseating the spherical valve at the other end of the casing, a rod mounted in said lug for free endwise movement, said rod being in alignment with the centers of the valve seats and dimensioned so as to be contacted with by the rolling spherical valves and prevent both valves from seating at the same time.

2. A valve for dispensing fuel from an aircraft tank comprising an elongated valve casing, having intake ports arranged at opposite ends of the casing and an outlet port intermediate the ends of the valve, said inlet ports being adapted to be connected to the tank at points adjacent the front and rear sides thereof respectively, a valve seat disposed between each intake port and the outlet port, a spherical valve disposed between each valve seat and the outer end of the casing, guiding means for each spherical valve on which it will roll and move in a line perpendicular to the plane of the seat when said valve casing is tilted, said guiding means being constructed so as to permit free flow of fuel from the intake port past the spherical valve when in open position, means for stopping the movement of the spherical valve toward its intake port so as to provide a free passage for fuel from the intake port around the spherical valve and through the open seat to the outlet port, a lug disposed in the valve casing between the valve seats and serving as a baffle to prevent fuel entering through an open seat contacting with and unseating the spherical valve at the other end of the casing, a device mounted in said lug for free movement between the valves and having contacting members substantially in alignment with the centers of the valve seats and dimensioned so as to be contacted with by the rolling spherical valves and prevent both valves from seating at the same time.

ARTHUR L. PARKER.